United States Patent
Jo et al.

(10) Patent No.: US 11,674,068 B2
(45) Date of Patent: Jun. 13, 2023

(54) HYDROGEN EXTRACTION REACTOR AND HYDROGEN EXTRACTION PROCESS USING PHASE CHANGE MATERIALS

(71) Applicant: KOREA INSTITUTE OF SCIENCE AND TECHNOLOGY, Seoul (KR)

(72) Inventors: Young Suk Jo, Seoul (KR); Yong Min Kim, Seoul (KR); Chang Won Yoon, Seoul (KR); Hyangsoo Jeong, Seoul (KR); Hyuntae Sohn, Seoul (KR); Seong Cheol Jang, Seoul (KR); Suk Woo Nam, Seoul (KR); Jonghee Han, Seoul (KR); Seongeun Moon, Seoul (KR); Yeonsu Kwak, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 100 days.

(21) Appl. No.: 17/195,642

(22) Filed: Mar. 9, 2021

(65) Prior Publication Data
US 2022/0162490 A1  May 26, 2022

(30) Foreign Application Priority Data
Nov. 25, 2020  (KR) .................. 10-2020-0160191

(51) Int. Cl.
*C09K 5/04* (2006.01)
*C01B 3/24* (2006.01)
(Continued)

(52) U.S. Cl.
CPC .......... *C09K 5/048* (2013.01); *B01J 19/087* (2013.01); *C01B 3/24* (2013.01); *H05B 1/0247* (2013.01); *H05B 7/02* (2013.01)

(58) Field of Classification Search
CPC .......... C01B 3/24; C01B 2203/0233; C01B 2203/043; C01B 2203/1241;
(Continued)

(56) References Cited

U.S. PATENT DOCUMENTS 7,901,491 B2  3/2011  Zhao et al.
10,435,296 B2  10/2019  Yoon et al.
(Continued)

FOREIGN PATENT DOCUMENTS

EP  3565045 A1 * 11/2019 ............ B01J 8/0461
JP  2009242232 A  10/2009
(Continued)

OTHER PUBLICATIONS

Korean Office Action for KR Application No. 10-2020-0160191 dated Jun. 3, 2022, citing the above reference(s).

*Primary Examiner* — Steven J Bos
*Assistant Examiner* — Syed T Iqbal
(74) *Attorney, Agent, or Firm* — Cantor Colburn LLP

(57) ABSTRACT

According to one embodiment of the present invention, there is provided a hydrogen extraction reactor, comprising a chamber including an inner space; a reaction unit which is provided to pass through the inside of the chamber and where an endothermic reaction for hydrogen extraction occurs; a heating unit which is provided to be spaced apart from the reaction unit inside the chamber and transfers heat to the inside of the chamber; and a heat transfer material which is provided between the reaction unit and the heating unit in the chamber, wherein the heat transfer material undergoes a phase transition between a gas phase and a liquid phase according to the entry and exit of heat from the heating unit or the reaction unit.

14 Claims, 13 Drawing Sheets
(8 of 13 Drawing Sheet(s) Filed in Color)

(51) Int. Cl.
*H05B 1/02* (2006.01)
*H05B 7/02* (2006.01)
*B01J 19/08* (2006.01)

(58) Field of Classification Search
CPC .............. C01B 2203/0283; C01B 3/34; C01B 2203/0227; C01B 2203/0272; C01B 2203/84; C01B 2203/0266; C01B 2203/04; C01B 2203/1235; C01B 2203/061; C01B 2203/127; C01B 2203/0485; C01B 2203/025; C01B 2203/0465; C01B 2203/062; C01B 2203/0475; C01B 2203/048; C01B 2203/0861; C01B 2203/0415; C01B 2203/0877; C01B 3/56; C01B 2203/042; C01B 2203/068; C01B 3/38; C01B 3/52; C01B 2203/142; C01B 2203/0261; C01B 3/382; C01B 2203/045; C01B 2203/147; C01B 2203/0435; C01B 3/386; C01B 3/58; C01B 3/22; C01B 2203/06; C01B 2203/0811; C01B 2203/0822; C01B 2203/0238; C01B 2203/0833; C01B 2203/085; C01B 3/26; C01B 2203/86; C01B 3/36; C01B 3/50; C01B 2203/0216; C01B 2203/0255; C01B 3/342; C01B 2203/0883; C01B 2203/0277; C01B 2203/066; C01B 2203/1247; C01B 2203/82; C01B 32/05; C01B 17/046; C01B 17/58; C01B 2203/0495; C01B 32/40; C01B 2203/0866; C01B 2203/0872; C01B 3/02; C01B 13/0229; C01B 2203/0805; C01B 2203/148; C01B 2203/0816; C01B 3/047; C01B 2203/065; C01B 32/50; C01B 2203/0244; C01B 3/04; C01B 3/32; C01B 3/48; C01B 3/506; C01B 2203/0205; C01B 2203/049; C01B 2203/0827; C01B 2203/1082; C01B 2203/146; C01B 3/323; C01B 2203/02; C01B 2203/0405; C01B 2203/0894; C01B 2203/1041; C01B 3/042; C01B 21/0427; C01B 2203/041; C01B 2203/047; C01B 2203/1052; C01B 2203/1058; C01B 2203/1217; C01B 2203/1258; C01B 2203/169; C01B 23/0031; C01B 3/0021; C01B 7/035; C01B 13/0207; C01B 2203/0222; C01B 2203/1047; C01B 2203/1076; C01B 2203/1205; C01B 2203/1628; C01B 3/363; C01B 3/384; C01B 13/0248; C01B 15/01; C01B 15/037; C01B 17/505; C01B 21/02; C01B 2203/0425; C01B 2203/0445; C01B 2203/0838; C01B 2203/0844; C01B 2203/10; C01B 2203/1223; C01B 2203/1276; C01B 2203/1604; C01B 2203/1614; C01B 2203/1695; C01B 2210/0046; C01B 3/045; C01B 3/06; C01B 3/10; C01B 3/12; C01B 3/344; C01B 3/40; C01B 3/503; C01B 3/505; C01B 32/205; C01B 13/0214; C01B 2203/0288; C01B 2203/044; C01B 2203/0855; C01B 2203/1011; C01B 2203/1017; C01B 2203/1023; C01B 2203/1064; C01B 2203/107; C01B 2203/1211; C01B 2203/1229; C01B 2203/143; C01B 3/025; C01B 3/105; C01B 3/16; C01B 3/348; C01B 32/15; C01B 32/956; C01B 4/00; C01B 5/00; C09K 5/048; B01J 19/087; H05B 1/0247; H05B 7/02
See application file for complete search history.

(56) References Cited

U.S. PATENT DOCUMENTS

2011/0207027 A1\* 8/2011 Kim .......................... C01B 3/00
  222/3
2013/0336826 A1\* 12/2013 Kim ..................... F04B 43/025
  417/474

FOREIGN PATENT DOCUMENTS

| KR | 20060022651 A | | 3/2006 |
| KR | 101845515 B1 | | 4/2018 |
| KR | 10-2018-0078522 A | | 7/2018 |
| KR | 2018/0078522 | \* | 7/2018 |
| WO | 2005000457 A2 | | 1/2005 |

\* cited by examiner

HYDROGEN EXTRACTION REACTOR AND HYDROGEN EXTRACTION PROCESS USING PHASE CHANGE MATERIALS

TECHNICAL FIELD

The present invention relates to a hydrogen extraction reactor and a hydrogen extraction process.

BACKGROUND ART

Hydrogen has recently attracted attention as an environment-friendly and sustainable energy carrier capable of storing large amounts of renewable energy of 0.1 MWh to 10 MWh per pressure tank or 0.1 MWh to 100 GWh per liquid tank. At the same time, hydrogen energy is being actively developed as an efficient energy system that can replace the existing energy system driven by fossil fuels that negatively affect the environment. Accordingly, the hydrogen fuel cell has established itself as an environment-friendly system having high efficiency and water ($H_2O$) as a by-product.

Hydrogen has a very high energy density (33.3 $kWh \cdot kg^{-1}$) relative to weight, but it has a low energy density (2.97 $Wh \cdot L^{-1}$, $H_2$ gas, 0° C., 1 atmosphere) relative to its volume, and is thus required to be stored in an appropriate way to increase the energy density relative to volume. Accordingly, in order to efficiently store hydrogen, physical hydrogen storage methods such as compressed hydrogen storage, liquefied hydrogen storage and the like have been extensively studied industrially, but these methods have problems of safety and energy loss. For this reason, interest in chemical hydrogen storage methods capable of stably storing potentially large amounts of hydrogen is increasing. Candidate materials that can be used for chemical hydrogen storage methods include liquid organic hydrogen carriers (LOHCs), methylcyclohexane (MCH), perhydro-dibenzyl-toluene (H18-DBT), methanol ($CH_3OH$), ethanol ($C_2H_5OH$), sodium borohydride ($NaBH_4$), ammonia borane ($NH_3BH_3$), formic acid ($HCO_2H$), and the like.

Meanwhile, since these chemical hydrogen storage methods involve a chemical reaction, thermal efficiency is important in order to improve catalytic reactivity. Although there are various methods for providing heat inside the reactor, it is difficult to evenly transfer heat to the entire reactor because heating is performed locally near a heat source. In particular, as the entry and exit of heat by an endothermic reaction and the supply of heat by a heat source are performed in combination in the reactor, the temperature may vary for each region inside the reactor, thereby causing a decrease in thermal efficiency. Additionally, in order to reduce the above-described problem, when heat sources are arranged in various places so that heat can be evenly transferred inside the reactor, the reactor design may be greatly limited. Accordingly, there is a need for a new reactor and a method for performing a process capable of evenly transferring heat inside the reactor while increasing the degree of freedom in reactor design.

DISCLOSURE

Technical Problem

An object of the present invention is to provide a hydrogen extraction reactor in which the reaction efficiency is improved by maintaining a constant temperature in the reactor, where hydrogen extraction reaction occurs, and a hydrogen extraction process.

Another object of the present invention is to provide a hydrogen extraction reactor with a high degree of freedom in design so as to use various types of heat sources.

SUMMARY

According to one embodiment of the present invention, there is provided a hydrogen extraction reactor, which includes a chamber including an inner space; a reaction unit which passes through the inside of the chamber and where an endothermic reaction for hydrogen extraction occurs; a heating unit which is provided to be spaced apart from the reaction unit in the chamber and transfers heat to the inside of the chamber; and a heat transfer material which is provided between the reaction unit and the heating unit in the chamber, wherein the heat transfer material undergoes a phase transition between a gas phase and a liquid phase according to the entry and exit of heat from the heating unit or the reaction unit.

According to one embodiment of the present invention, there is provided a hydrogen extraction reactor, wherein the endothermic reaction which occurs in the reaction unit includes at least one selected from the group consisting of a reforming reaction of methane, a reforming reaction of methanol, a decomposition reaction of ammonia, a dehydrogenation reaction of liquid organic hydrogen carriers (LOHCs), a dehydrogenation reaction of formic acid or formate, a reforming reaction of dimethylether, and a combination thereof.

According to one embodiment of the present invention, there is provided a hydrogen extraction reactor, wherein the endothermic reaction which occurs in the reaction unit is a dehydrogenation reaction of liquid organic hydrogen carriers, and a hydrogen separation unit for separating hydrogen from the liquid organic hydrogen carriers is further provided at an outlet of the reaction unit.

According to one embodiment of the present invention, there is provided a hydrogen extraction reactor, wherein at least a portion of the hydrogen separated from the hydrogen separation unit is supplied to the heating unit and combusted.

According to one embodiment of the present invention, there is provided a hydrogen extraction reactor, wherein the heating unit includes at least one selected from a combustion device that provides heat by combusting fuel, an electric heating device that provides heat generated from resistance when an electric current flows, a heat generating device using induction, and a combination thereof.

According to one embodiment of the present invention, there is provided a hydrogen extraction reactor, wherein the heat transfer material circulates in the chamber.

According to one embodiment of the present invention, there is provided a hydrogen extraction reactor, wherein the chamber further includes a pressure control valve capable of controlling the internal pressure of the chamber, and controls the phase transition temperature of the heat transfer material by controlling the pressure control valve.

According to one embodiment of the present invention, there is provided a hydrogen extraction process, which includes: a first step of supplying a hydrogen storage material to a reaction unit provided in the chamber; a second step of transferring heat to a heat transfer material provided in the chamber using a heating unit provided in the chamber; a third step of transferring heat from the heat transfer material to the reaction unit and the hydrogen storage material in the reaction unit; and a fourth step of performing hydrogen extraction reaction of releasing hydrogen from the hydrogen storage material using the transferred heat, wherein during the second to fourth steps, the heat transfer material undergoes a phase transition between a gas phase and a liquid phase so as to control the temperature inside the chamber such that it does not deviate from the preset temperature range.

According to one embodiment of the present invention, there is provided a hydrogen extraction process, wherein the preset temperature range is from 150° C. to 400° C.

According to one embodiment of the present invention, there is provided a hydrogen extraction process, which further includes a fifth step of separating the hydrogen extracted from the reaction unit.

Advantageous Effects

According to one embodiment of the present invention, reaction efficiency can be enhanced by maintaining a constant temperature in the reactor where a hydrogen extraction reaction occurs.

According to one embodiment of the present invention, various types of heat sources can be used, and thus the degree of freedom in designing reactor and process is high.

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION OF PREFERRED EMBODIMENTS

Figure 1:
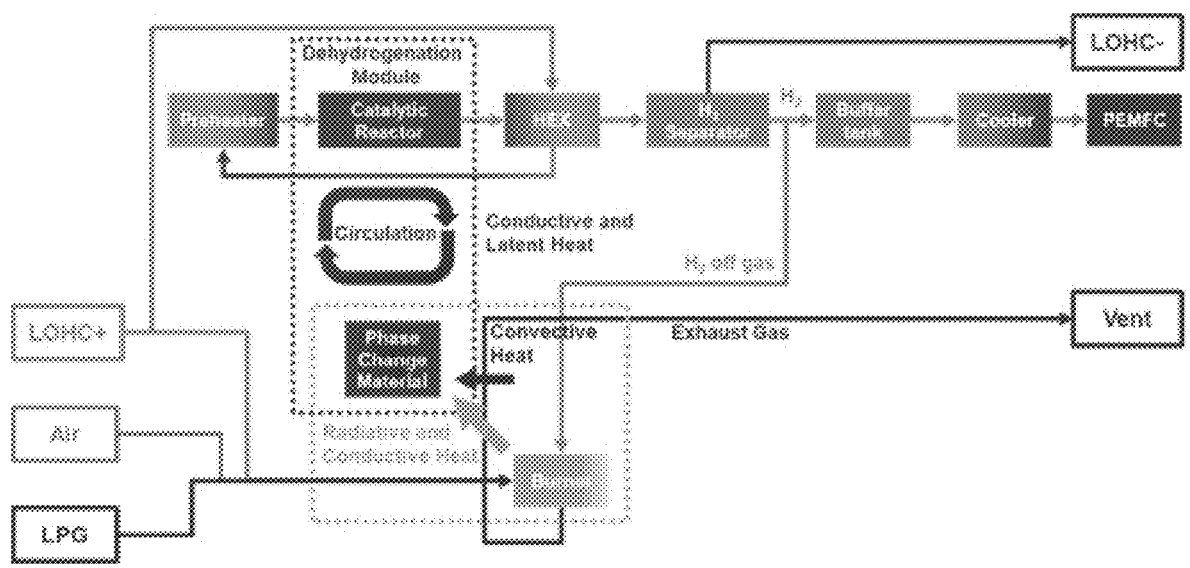
FIG. 1 is a block diagram showing the hydrogen extraction reaction reactor and system according to one embodiment of the present invention.

The present invention can be variously changed and may have a number of forms, and thus, specific embodiments will be illustrated in the drawings and described herein in detail. However, this is not intended to limit the present invention to the specific form(s) disclosed, but it should be understood that the present invention include all changes, equivalents, and substitutes included in the spirit and scope of the present invention.

In describing the drawings, like reference numerals are used for like elements. In the accompanying drawings, the dimensions of the structures may be enlarged than the actual dimensions for clarity of the invention. Although the terms first, second, and the like, may be used herein to describe various elements, these elements should not be limited by these terms. These terms are only used to distinguish one element from another element. For example, a first element could be termed a second element, and, similarly, a second element could be termed a first element, without departing from the scope of the present invention. Further, the singular forms are intended to include the plural forms as well, unless the context clearly indicates otherwise.

In the present application, it should be understood that terms "including", "having", and the like are intended to designate the existence of features, numbers, steps, operations, constituent elements, and components described in the specification or a combination thereof, and do not exclude the possibility of the existence or addition of one or more other features, numbers, steps, operations, constituent elements, and components, or a combination thereof in advance. It should also be understood that when an element such as a layer, film, region, or substrate is placed "on" or "above" another element, it indicates not only a case where the element is placed "directly on" or "just above" the other element but also a case where a further element is interposed between the element and the other element. Further, in the present specification, when an element such as a layer, film, region, or substrate is formed on another element, the formed direction is not limited to an upper direction, but those in which the element is formed on a side and a lower direction should also be included. On the contrary, it should also be understood that when an element such as a layer, film, region, or substrate is placed "beneath" or "below" another element, it indicates not only a case where the element is placed "directly beneath" or "just below" the other element but also a case where a further element is interposed between the element and the other element.

In the present specification, the terms "upper surface" and "lower surface" are used as relative concepts to facilitate the understanding of the technical concept of the present invention. Therefore, the "upper surface" and "lower surface" do not designate a specific direction, position, or constituent element and may be used interchangeably. For example, "upper surface" may be interpreted as 'back side', and "lower surface" may be interpreted as "upper surface". Therefore, "upper surface" may be expressed as "first surface", and "lower surface" may be expressed as "second surface", while "lower surface" may be expressed as "first surface" and "upper surface" may be expressed as "second surface". However, "upper surface" and "lower surface" are not used interchangeably with each other within one embodiment.

According to one embodiment of the present invention, there is provided a hydrogen extraction reactor including a heat transfer material, which undergoes a phase transition between a gas phase and a liquid phase. Such a hydrogen extraction reactor can maintain a constant internal temperature of the reactor and use a variety of heat sources, thereby providing excellent reaction efficiency.

Figure 2:
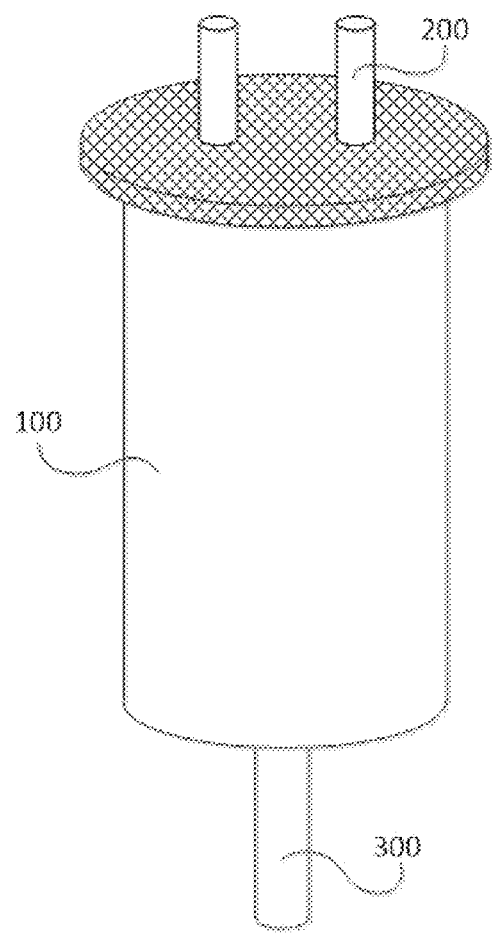
FIG. 2 is a perspective view showing the hydrogen extraction reactor according to one embodiment of the present invention.
Figure 3:
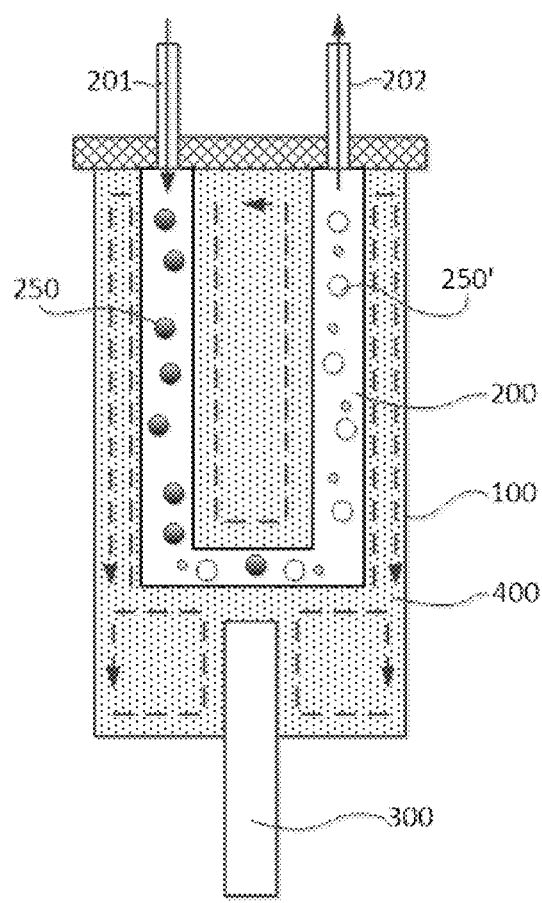
FIG. 3 is a cross-sectional view showing the hydrogen extraction reactor according to FIG. 2.

FIG. 1 is a block diagram showing the hydrogen extraction reaction reactor and system according to one embodiment of the present invention. FIG. 2 is a perspective view showing the hydrogen extraction reactor according to one embodiment of the present invention. FIG. 3 is a cross-sectional view showing the hydrogen extraction reactor according to FIG. 2.

Referring to FIGS. 1 to 3, the hydrogen extraction reactor includes a chamber 100 including an inner space; a reaction unit 200 which is provided to pass through the inside of the chamber 100, and where an endothermic reaction for hydrogen extraction occurs; a heating unit 300 which is provided to be spaced apart from the reaction unit 200 in the chamber 100 and transfers heat to the inside of the chamber 100; and a heat transfer material 400 which is provided between the reaction unit 200 and the heating unit 300 in the chamber 100, wherein the heat transfer material 400 undergoes a phase transition between a gas phase and a liquid phase according to the entry and exit of heat from the heating unit 300 or the reaction unit 200.

The hydrogen extraction reactor may be an apparatus for producing hydrogen gas through a reaction of separating hydrogen gas from a compound containing hydrogen atoms in a molecule. For example, the hydrogen stored in the form of liquid organic hydrogen carriers (LOHCs), methylcyclohexane (MCH), perhydro-dibenzyltoluene (H18-DBT), methanol ($CH_3OH$), sodium borohydride ($NaBH_4$), ammonia borane ($NH_3BH_3$), formic acid ($HCO_2H$), and the like may be extracted in the form of hydrogen gas through the hydrogen extraction reactor, and the extracted hydrogen gas may be used for various purposes such as a fuel cell. Accordingly, the hydrogen extraction reactor may be used alone or provided in connection with a device utilizing hydrogen gas such as a fuel cell.

The size and form of the hydrogen extraction reactor may vary depending on the type of hydrogen extraction reactor used, as described above. For example, the hydrogen extraction reactor may be provided in a hydrogen vehicle including a fuel cell, and in this case, the size may be relatively small as it must be used inside the vehicle. In addition, in some cases, the hydrogen extraction reactor may be provided as part of an industrial plant for producing hydrogen gas, in which case the size of the hydrogen extraction reactor may be relatively large so as to increase the processing capacity of the hydrogen extraction reaction. Therefore, those skilled in the art can design the hydrogen extraction reactor in various shapes and sizes.

The hydrogen extraction reactor includes a chamber 100, a reaction unit 200, a heating unit 300, and a heat transfer material 400.

First, the chamber 100 may be a housing including a space, in which the reaction unit 200, the heating unit 300, and the heat transfer material 400 may be provided. The chamber 100 can absorb an external physical shock and prevent unnecessary heat from entering and leaving the chamber 100. Accordingly, the chamber 100 may be provided to include an insulating material on the wall surface.

The shape of the chamber 100 may vary. For example, the chamber 100 may have a cylindrical shape as shown in the drawing. Alternatively, the chamber 100 may have various shapes such as a cube, a rectangle, a quadrapod, a tripod, a sphere, an elliptical sphere, and the like. In addition, the chamber 100 may be provided vertically to the ground as shown, but may be provided horizontally with the ground or obliquely the ground as needed. The form of providing the chamber 100 may be changed in consideration of the processing capacity of the hydrogen extraction reactor, the installation location, and the connection relationship with other members.

The reaction unit 200 is provided in the chamber 100.

In the reaction unit 200, an endothermic reaction for hydrogen extraction occurs. The reaction unit 200 may be provided in a form starting from the outside of the chamber 100, passing through the chamber 100, and extending to the outside of the chamber 100. The reaction unit 200 may be provided in the form of a pipe passing through the inside of the chamber 100, for example as shown in the drawing, and both ends of the reaction unit 200 may be provided outside the chamber 100. However, these forms of the reaction unit 200 are only exemplary, and the reaction unit 200 may be provided in the form of a batch in the chamber 100.

The endothermic reaction for hydrogen extraction to be performed in the reaction unit 200 may be a reaction which produces hydrogen gas through a reaction of separating hydrogen gas from a hydrogen storage material 250 including hydrogen atoms, as described above. For example, the endothermic reaction may include at least one selected from the group consisting of a reforming reaction of methane, a reforming reaction of methanol, a decomposition reaction of ammonia, a dehydrogenation reaction of liquid organic hydrogen carriers (LOHCs), a dehydrogenation reaction of formic acid or formate, a reforming reaction of dimethylether, and a combination thereof.

The above-described endothermic reaction to be performed in the reaction unit 200 may be a reaction in which the hydrogen storage material 250 is used. The hydrogen storage material 250 may include at least one selected from the group consisting of methylcyclohexane (MCH), perhydro-dibenzyltoluene (H18-DBT), methanol ($CH_3OH$), sodium borohydride ($NaBH_4$), ammonia borane ($NH_3BH_3$), formic acid ($HCO_2H$), and liquid organic hydrogen carriers (LOHCs). The liquid organic hydrogen carrier (LOHC) may include, for example, at least one material selected from the group consisting of biphenyl, diphenylmethane, toluene, methylindole, ethylcarbazole, and dibenzyl toluene. The liquid organic hydrogen carrier (LOHC) has advantages in that it has a large hydrogen storage capacity relative to volume and can reversibly perform hydrogenation (hydrogen storage) and dehydrogenation (hydrogen emission) multiple times.

The reaction unit 200 may include a reaction unit inlet 201 and a reaction unit outlet 202. The hydrogen storage material 260 storing hydrogen may be introduced into the reaction unit inlet 201, and a dehydrogenated material 250', from which hydrogen has been removed, and hydrogen gas may be released through the reaction unit outlet 202. Therefore, the hydrogen storage material 260 is introduced into the reaction unit 200, which is inserted into the chamber 100 through the reaction unit inlet 201, and after the endothermic reaction of separating hydrogen is performed in the reaction unit 200, the dehydrogenated material 250' and hydrogen in the form of gas may be released through the reaction unit outlet 202.

The reaction unit inlet 201 may thus be connected to a storage tank for storing the hydrogen storage material 250 or the like.

The reaction unit outlet 202 may also be connected to a hydrogen separation unit for separating the dehydrogenated material 250' and hydrogen gas, a hydrogen storage tank, a storage tank for a dehydrogenated material, and the like.

A catalyst may be provided in the reaction unit 200 to promote the hydrogen extraction reaction described above. The catalyst may be, for example, a catalyst metal such as ruthenium (Ru) and lanthanum (La) supported on a support such as alumina ($Al_2O_3$). Additionally, the catalyst may be provided in the form of a packed bed, but is not limited thereto, and may be provided in any form as long as it can make contact with the hydrogen storage material.

In the reaction unit 200, at least a part of the region between the reaction unit inlet 201 and the reaction unit outlet 202 is provided in the chamber 100. The above-described region of the reaction unit 200 may involve heat exchange within the chamber 100. For example, the reaction heat required for the endothermic reaction (dehydrogenation of a hydrogen storage material) performed in the reaction unit 200 may be transferred from the inside of the chamber 100 to the reaction unit 200.

The heating unit 300 is provided in the chamber 100 in order to supply heat to the reaction unit 200.

The heating unit 300 functions as a heat source and supplies heat to the inside of the chamber 100 including the reaction unit 200. The heating unit 300 may include at least one selected from a combustion device that provides heat by combusting fuel, an electric heater that provides heat generated from resistance when an electric current flows, a heat generating device using induction, and a combination thereof.

The heating unit 300 may be provided on one side of the chamber 100 as shown in the drawing in some cases, but there is no limitation on the location and form of providing the heating unit 300, and the heat generation method. The reason as to why the heating unit 300 can be designed without limitation is that a heat transfer material 400 is provided between the heating unit 300 and the reaction unit 200 in the chamber 100. The details on this will be described later. Since the heating unit 300 can be designed without limitations, the degree of freedom in reactor design is very high. Accordingly, the hydrogen extraction reactor can be designed into a compact size or large size as required without limitations to be provided for use.

When the heating unit 300 includes a combustion device that provides heat by combusting fuel, at least a part of the hydrogen gas extracted from the reaction unit 200 may be provided to the heating unit 300 for combustion. In this case, air and hydrocarbon fuel may be provided together to the inside of the heating unit 300 as needed for combustion.

At least a part of the heating unit 300 may be provided to be inserted into the chamber 100. Accordingly, the heat generated from the heating unit 300 may be transferred to the inside of the chamber 100 through the region, which is inserted into the chamber 100 of the heating unit 300. In particular, the heating unit 300 is provided to be spaced apart from the reaction unit 200 in which an endothermic reaction is performed. A heat transfer material 400 is provided between the heating unit 300 and the reaction unit 200, which are spaced apart.

The heat transfer material 400 is provided in the chamber 100 and transfers heat supplied from the heating unit 300 to the reaction unit 200, in which an endothermic reaction is performed. Accordingly, at least a part of the heat transfer material 400 is provided in a form that makes contact with the heating unit 300 and the reaction unit 200.

The heat transfer material 400 transfers the heat received from the heating unit 300 to the reaction unit 200 through conduction and convection. Additionally, the heat transfer material 400 may undergo a phase transition between a gas phase and a liquid phase in the process of transferring heat. Accordingly, when heat is provided more than necessary from the heating unit 300, some of the heat received may be absorbed as a phase transition energy which converts the heat transfer material 400 from a liquid phase to a gas phase. As the heat transfer material 400 undergoes a phase transition and stores at least a part of heat as latent heat, the inside of the chamber 100 may be prevented from being overheated. Further, as the heat transfer material 400 in a gas phase is circulated in the chamber 100, it may move far from the heating unit 300. In this case, as the heat transfer material 400 in a gas phase undergoes a phase transition back to a liquid phase at a region far from the heating unit 300, the latent heat is released into the chamber 100, and the temperature at the region far from the heating unit 300 may increase. Accordingly, the internal temperature the chamber 100 can be uniformly maintained by using the phase transition and circulation of the heat transfer material 400. In particular, even when the heating unit 300 is provided only on one side of the chamber 100, a constant temperature can be maintained in the chamber 100 by using the heat transfer material 400, and thus the degree of freedom with respect to the form and location of providing the heating unit 300 can be improved.

As the heat transfer material 400 maintains the temperature at a constant level, a relatively uniform amount of heat may also be transferred to the reaction unit 200. In particular, the reaction unit 200 can be extended lengthwise within the chamber 100 as described above, and constant heat can be uniformly transferred to all of the areas of the reaction unit 200 provided in the chamber 100. Therefore, the endothermic reaction can be uniformly performed regardless of the position of the reaction unit 200. Since the region where the endothermic reaction is performed in the reaction unit 200 is relatively widened, the reactor efficiency can be enhanced.

The heat transfer material 400 may include a hydrocarbon-based organic material that can remain stable at a gas-liquid phase transition temperature for a long period of time while having a phase transition temperature of 150° C. to 400° C. For example, the heat transfer material 400 may include at least one selected from the group consisting of monobenzyltoluene, dibenzyltoluene, toluene, mono-$C_{12-14}$-alkyl derivatives, biphenyl, diphenyl oxide, diphenylmethane, and naphthalene.

As described above, the internal temperature of the chamber 100 can be constantly maintained within the preset temperature range by using the heat transfer material 400. In addition, the boiling point of the heat transfer material 400 can be controlled by controlling the internal pressure of the chamber 100, and through this, the internal temperature of the chamber 100 can be adjusted to a desired range. Specifically, when the internal pressure of the chamber 100 increases, the boiling point of the heat transfer material 400 increases, and accordingly, the internal temperature of the chamber 100 can be maintained at a relatively high level as the phase transition is performed at a higher temperature. In contrast, when the internal pressure of the chamber 100 decreases, the boiling point of the heat transfer material 400 decreases, and accordingly, the internal temperature of the chamber 100 can be maintained at a relatively low level as the phase transition is performed at a lower temperature. Accordingly, in order to control the internal pressure of the chamber 100, a pressure control valve may be further provided in the chamber 100.

In order to circulate the heat transfer material 400, a circulation device may be further provided in the chamber 100. The circulation device may be implemented in various forms, such as a blade for stirring. Accordingly, the heat transfer material 400 in a gas phase may be adsorbed on the surface of the reaction unit 200 or the heating unit 300 to be continuously circulated within the chamber 100 without decreasing heat transfer efficiency. In addition, as the heat transfer material 400 in a gas phase moves to a low temperature region and undergoes a phase transition back to a liquid phase, the internal temperature of the chamber 100 can be uniformly maintained, as described above.

According to one embodiment of the present invention, since the heat transfer material 400 is provided between the heating unit 300 and the reaction unit 200 and transfers heat while undergoing a phase transition between the gas phase and the liquid phase, the internal temperature of the chamber 100 including the reaction unit 200 can be constantly maintained. Accordingly, it is possible to prevent the problem that a specific area in the chamber 100 is overheated and thus heat is wasted unnecessarily. Further, the reactor efficiency can be improved by allowing the endothermic reaction to be simultaneously performed in a wider area of the reaction unit 200.

In the above, the forms of providing the hydrogen extraction reactor according to one embodiment of the present invention have been described. Hereinafter, the forms of the hydrogen extraction reactor according to other embodiments will be further described.

Figure 4:
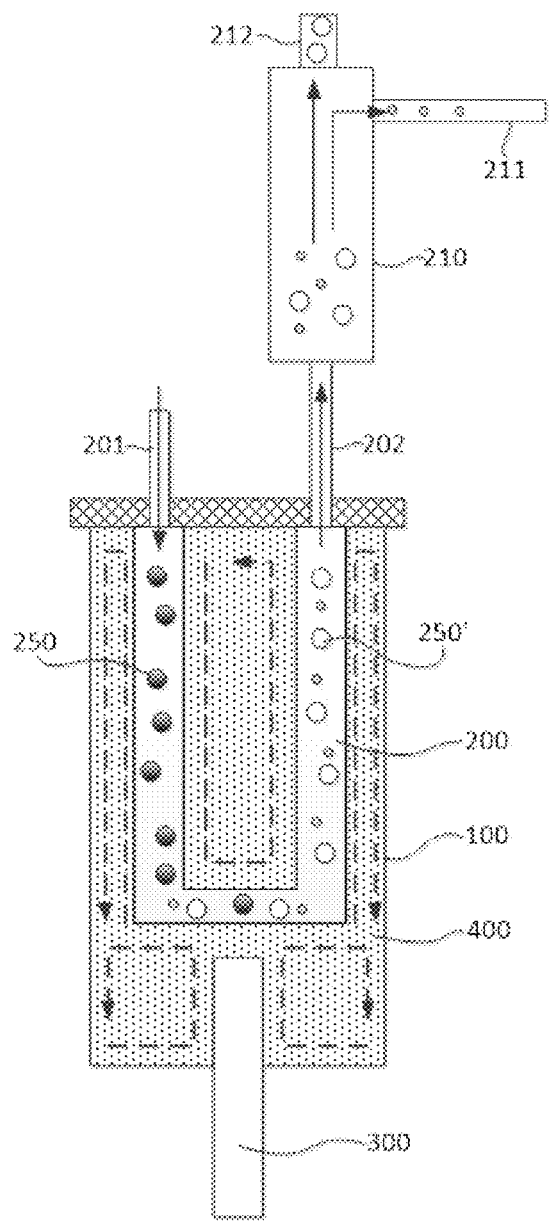
FIG. 4 is a cross-sectional view showing the hydrogen extraction reactor according to another embodiment of the present invention.

FIG. 4 is a cross-sectional view showing the hydrogen extraction reactor according to another embodiment of the present invention.

Referring to FIG. 4, a hydrogen separation unit 210 connected to the reaction unit outlet 202 is further provided.

The hydrogen separation unit 210 functions to receive the dehydrogenated material 250' and hydrogen gas and then separate them. The hydrogen separation unit 210 may include an adsorbent in order to separate the dehydrogenated material 250' and hydrogen gas. The type of adsorbent may vary depending on the type of dehydrogenated material 250'. The adsorbent may include, for example, one or more of $CaCl_2/Al_2O_3$, $MgCl_2/Al_2O_3$, HZSM-5, HY, and 13X.

The hydrogen separation unit 210 may be provided in the form of a column. The dehydrogenated material 250' and hydrogen gas passing through the column may be separated from each other by being adsorbed or not adsorbed to the adsorbent according to their affinity for the adsorbent.

However, the above-described implementation form of the hydrogen separation unit 210 is only exemplary. The hydrogen separation unit 210 may be implemented in various forms, such as pressure swing adsorption (PSA), as needed.

The hydrogen separation unit 210 may include a hydrogen outlet 211 and a dehydrogenated material outlet 212. The hydrogen gas and the dehydrogenated material separated through theses outlets can be separately released. The hydrogen outlet 211 may be connected to the hydrogen storage tank and/or the heating unit 300. Accordingly, at least a part of the hydrogen gas may be provided to the heating unit 300, which is in the form of a combustion device, and combusted to supply heat to the reaction unit 200. In this case, there is an advantage in that the use of fuel or electricity can be reduced.

The dehydrogenated material outlet 212 may be connected to the storage tank for a dehydrogenated material. The dehydrogenated material 260 stored can be transferred a to the plant for hydrogen storage to be used.

Figure 5:
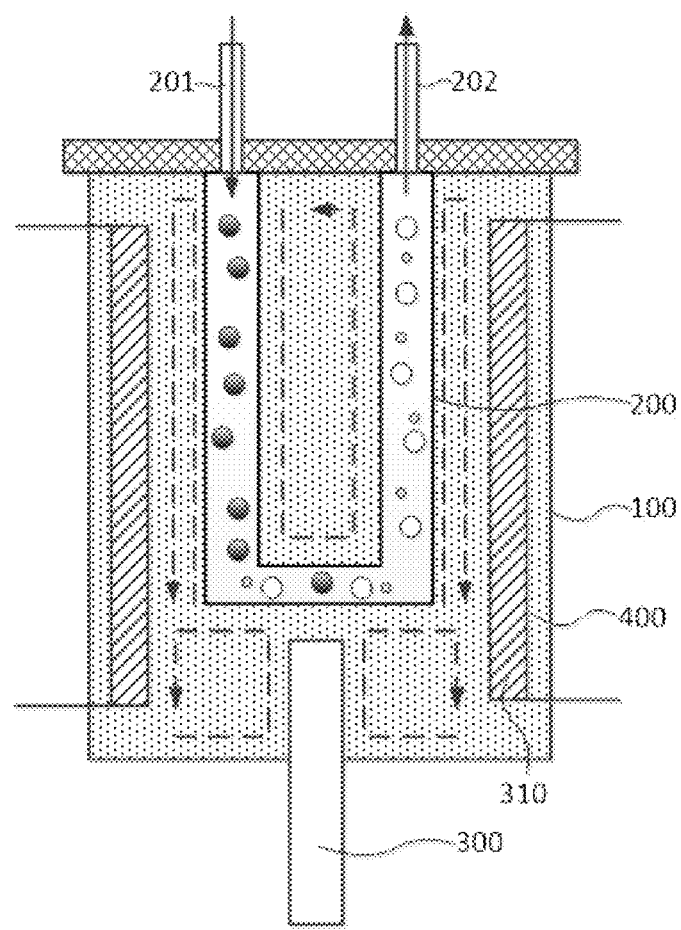
FIG. 5 is a cross-sectional view showing the hydrogen extraction reactor according to still another embodiment of the present invention.
Figure 6:
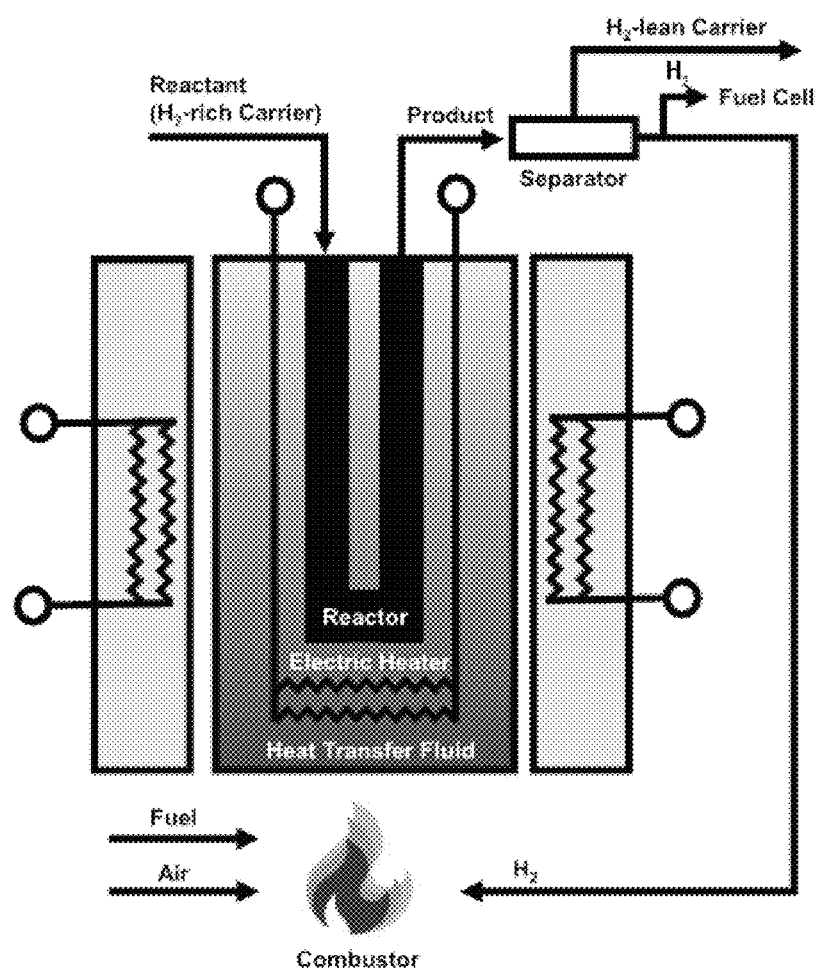
FIG. 6 is the reactor designed according to one embodiment of the present invention.

FIG. 5 is a cross-sectional view showing the hydrogen extraction reactor according to still another embodiment of the present invention.

Referring to FIG. 5, the hydrogen extraction reactor further includes an electric heater 310 provided on both sides of the reactor. The electric heater 310 includes a resistor, and heat may be generated when a current flows through the resistor. The heat generated from the electric heater 310 is transferred to the heat transfer material 400. By providing the electric heater 310, the hydrogen extraction reaction can be performed even without combustion. Therefore, even when a hydrogen extraction reactor is provided in a space where combustion is difficult, for example, in a hydrogen vehicle, the hydrogen extraction reaction can be performed using only electric heat. In particular, the electric heater 310 can utilize renewable energy. Accordingly, the hydrogen extraction reactor can be operated without producing greenhouse gases such as carbon dioxide during the reaction process.

The form of the electric heater 310 provided above is only exemplary, and may be provided in various forms. For example, the electric heater 310 may be provided only on one side of the chamber 100, unlike as shown in the drawings. In addition, several electric heaters 310 may be provided to surround the chamber 100, in which each electric heater 310 is independently controlled. In this case, the electric heater 310 is operated according to the temperature gradient in the chamber 100 along with the circulation of the heat transfer material 400, and thus, the internal temperature of the chamber 100 can be uniformly maintained with less energy.

Figure 7:
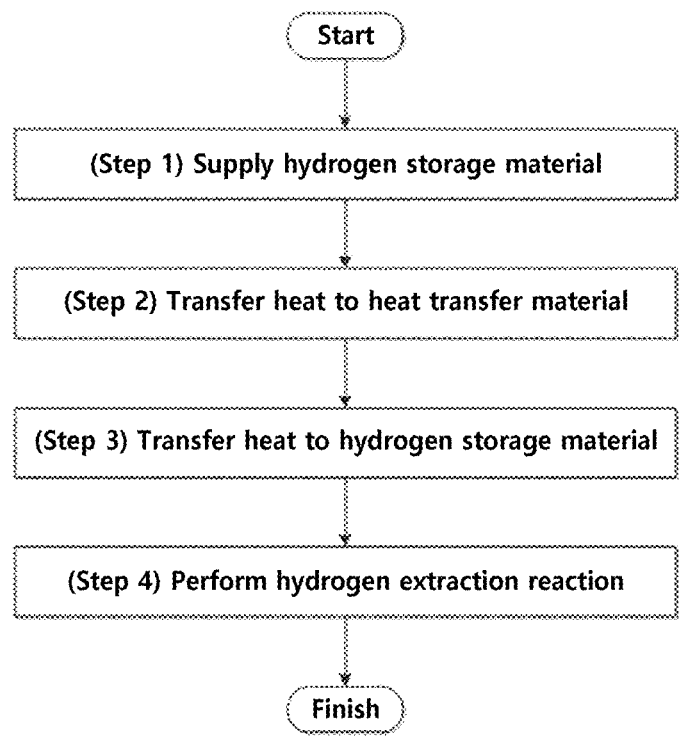
FIG. 7 is a flow chart showing the method of performing the hydrogen extraction process according to one embodiment of the present invention

FIG. 7 is a flow chart showing the method of performing the hydrogen extraction process according to one embodiment of the present invention.

The hydrogen extraction process according to one embodiment of the present invention includes: a first step of supplying a hydrogen storage material to a reaction unit provided in a chamber (S100); a second step of transferring heat to a heat transfer material provided in the chamber using a heating unit provided in the chamber (S200); a third step of transferring heat from the heat transfer material to the reaction unit and the hydrogen storage material in the reaction unit (S300); and a fourth step of performing a hydrogen extraction reaction of releasing hydrogen from the hydrogen storage material using the heat transferred (S400), wherein during the second to fourth steps (S200, S300, S400), the heat transfer material undergoes a phase transition between a gas phase and a liquid phase so as to control the internal temperature of the chamber such that it does not deviate from the preset temperature range.

In the hydrogen extraction process, the preset temperature may be in the range of about 150° C. to about 400° C. In the above-described temperature range, a dehydrogenation reaction in which hydrogen is removed from the liquid organic hydrogen carriers can be stably performed. Specifically, below the above-described temperature, the dehydrogenation reaction rate may be low, and the reaction equilibrium may not be sufficiently shifted toward the forward reaction. In addition, when the reaction temperature exceeds the above-described temperature, there is a concern that the liquid organic hydrogen carriers may be thermally decomposed.

The hydrogen extraction process may further include a fifth step of separating the hydrogen extracted from the reaction unit. The separation of hydrogen may be carried out in a variety of ways, such as PSA, general adsorption, and the like.

Figure 8:
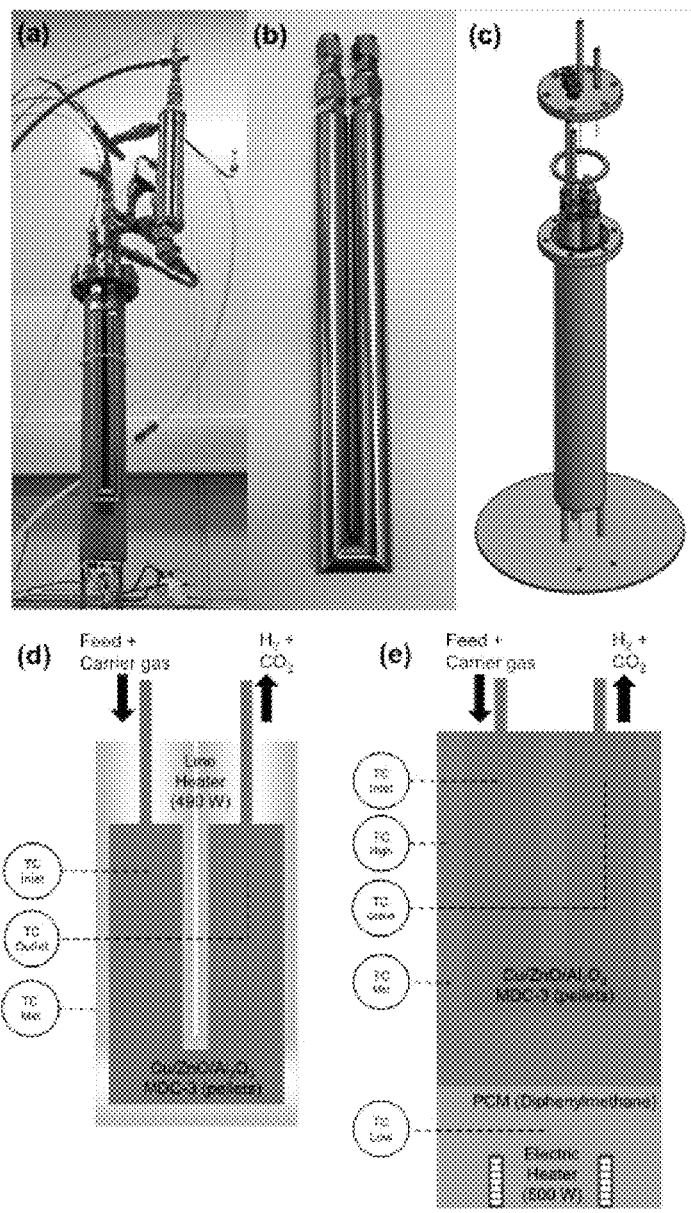
FIG. 8 is the reactor designed according to one embodiment of the present invention.

FIG. 8 is the reactor designed according to one embodiment of the present invention. Referring to FIG. 8, it can be seen that the heating unit includes both an electric heater (provided on both sides of the chamber and at the bottom of the reaction unit) and a combustion device.

The electric heater and the combustion device can each be independently controlled, and heating can be performed evenly and rapidly because they are provided in various areas of the chamber and the reaction section.

1. Design of Fuel Processor for Methanol Steam Reforming Reaction (MSR)

In the embodiment of the present invention, an MSR fuel processor was prepared as shown in FIG. 8 (a). At this time, two types of MSR fuel processors including different heating units were prepared.

First, an approximately 3-meter thermal tape (500 W) as shown in FIG. 8 (d) was evenly wound around a U-shaped reactor as shown in FIG. 8 (b), and heat conduction was simulated with a single heat source using the same. Next, as shown in FIG. 8 (e), an electric PCM heater was installed in a cylindrical stainless pipe reactor to heat the U-shaped reactor. The U-shaped reactor was made of ¾" stainless steel tube with an overall length of 50 cm and an inner diameter of 1.66 cm.

Here, since the boiling point of diphenylmethane (DPM) in a low-pressure state meets the process temperature range of methanol steam reforming, DPM was used as a heat transfer material.

Next, MDC-3 (Süd Chemie, 145 g) was charged into a U-shaped reactor. $Cu/ZnO/Al_2O_3$ (MDC-3, Süd Chemie, 10 g, BET surface area=70 $m^2$/g, total pore volume=0.18 cc/g, packing density=1.3 g/mL) was used as a catalyst. The catalytic activity for methanol steam reforming was tested by changing WHSV to the range of 0.7 $g/g_{cat}$/h to 1.7 $g/g_{cat}$/h (corresponds to 959 $mL/mL_{cat}$/h to 2,027 $mL/mL_{cat}$/h of GHSV) at atmospheric pressure (P=1 bar) and an inlet bed temperature of 250° C. The reaction mixture (SIC=1.3) was delivered by a multipurpose gear pump (Micropump I-drive, 500-6000 rpm). A check valve was installed on the downstream of the pump to ensure constant injection even under pressurized conditions.

Before supplying to the reactor of the two configurations shown in FIGS. 8 (d) and (e), the fuel mixture was heated and vaporized using a preheater (1 kW). The internal temperatures of the packed bed and the heat transfer material were monitored by several K-type thermocouples, which were then used as an indicator of the reaction temperature gradient. The uniformity of the temperature gradient in the reactor was evaluated by measuring the difference in temperature ($\Delta T_{outlet-inlet}$) between the inlet and the outlet.

Experimental Example 1-1. Comparison of Reactor Operation with or without Heat Transfer Material FIG. 9 shows graph illustrating the results of analyzing characteristics of the hydrogen extraction reactors according to Examples and Comparative Examples.

Figure 9:
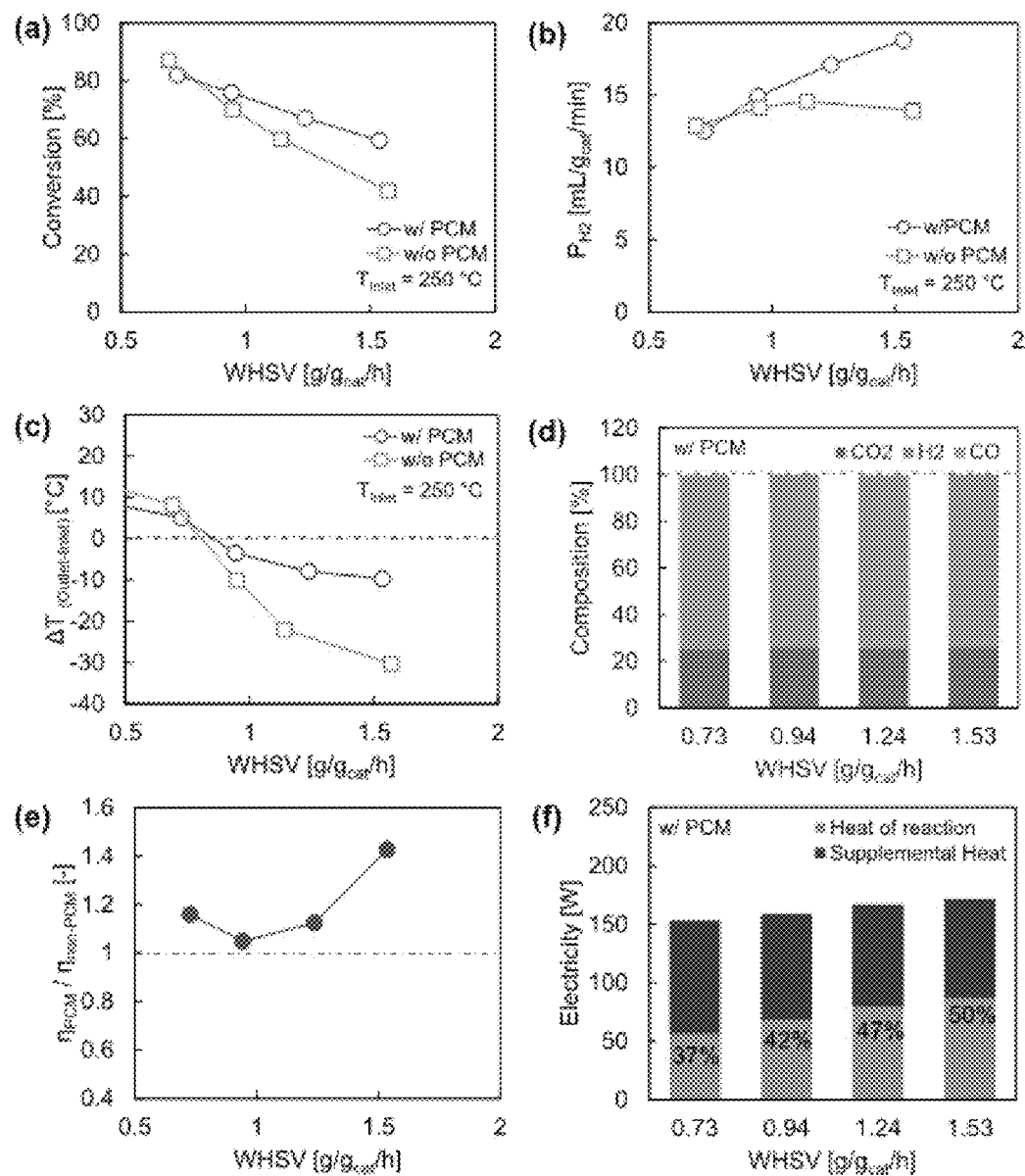
FIG. 9 shows graphs illustrating the results of analyzing characteristics of hydrogen extraction reactors according to Examples and Comparative Examples.

FIG. 9 shows the effect of the weight hourly space velocity (WHSV) on the composition of product gas according to a methanol conversion rate, hydrogen production rate, and temperature gradient between the bed inlet and outlet temperatures under the condition where the bed inlet temperature is controlled to be at 250° C.

Referring to FIGS. 9 (a) and (b), in order to confirm the improvement effect according to the difference in heating method, the U-shaped reactor used in the existing reactor was reused in the reactor using the heat transfer material. Diphenylmethane (DPM) was used as the heat transfer material.

As can be confirmed in FIG. 9 (c), in the case of the conventional reactor, the outlet temperature was much higher than the inlet temperature due to heat accumulation caused by the heat tape surrounding the U-shaped reactor at low WHSV.

However, after the endothermic reaction occurred at high WHSV, the outlet temperature was significantly decreased. For example, under the condition where WHSV was 1.57 $g/g_{cat}$/h, the difference between the outlet temperature and the inlet temperature was about 30° C., which is not a negligible level.

In comparison, when a heat transfer material was used, a high outlet temperature was observed due to heat accumulation. However, the difference between the inlet temperature and the outlet temperature was small at high WHSV. For example, under the condition where WHSV was 1.53 $g/g_{cat}$/h, the difference between the outlet temperature and the inlet temperature was less than 10° C. This means that the maximum temperature difference in the reactor was 10° C., confirming a uniform temperature gradient within the reactor.

Next, the composition of the reaction product gas was analyzed in order to confirm the reaction stoichiometry and the generation of CO.

In the entire process, hydrogen accounts for about 75% of the total gas, the $H_2/CO_2$ ratio was 2.9 (theoretical stoichiometry of $H_2/CO_2$ in the methanol steam reforming reaction was 3), and CO was hardly detected during heat stabilization (WHSV=<0.5% detection at 0.54 $g/g_{cat}$/h). This indicates that the product can be used as fuel cell grade hydrogen after further purification.

Referring to FIG. 9 (e), the reaction efficiency according to WHSV was measured. It was confirmed that the efficiency improvement factor was 1 or higher, which tended to follow the difference between the outlet and inlet temperatures. Both reaction systems showed the lowest efficiency improvement factor at WHSV=1 when the difference between the outlet temperature and the inlet temperature was minimal. After this point, the efficiency of the reactor containing the heat transfer material was increased as a sufficient amount of the catalyst was used, because the increase in the LHV of hydrogen of the produced hydrogen exceeded both the increase in the LHV of methanol, which is a reactant, and the increase in power consumption of the reactor.

Referring to FIG. 9 (f), the power consumption rate according to WHSV in the methane steam reforming reaction can be confirmed. The proportion of reaction enthalpy increased with increasing WHSV. Therefore, based on the results of FIG. 9 (f), the optimal WHSV for effectively operating the reactor can be determined.

Experimental Example 1-2. Confirmation of Temperature Homogenization Process in Reactor FIG. 10 shows the results of analyzing the temperature homogenization process in the start protocol of methanol steam reforming by vaporization of a heat transfer material.

Figure 10:
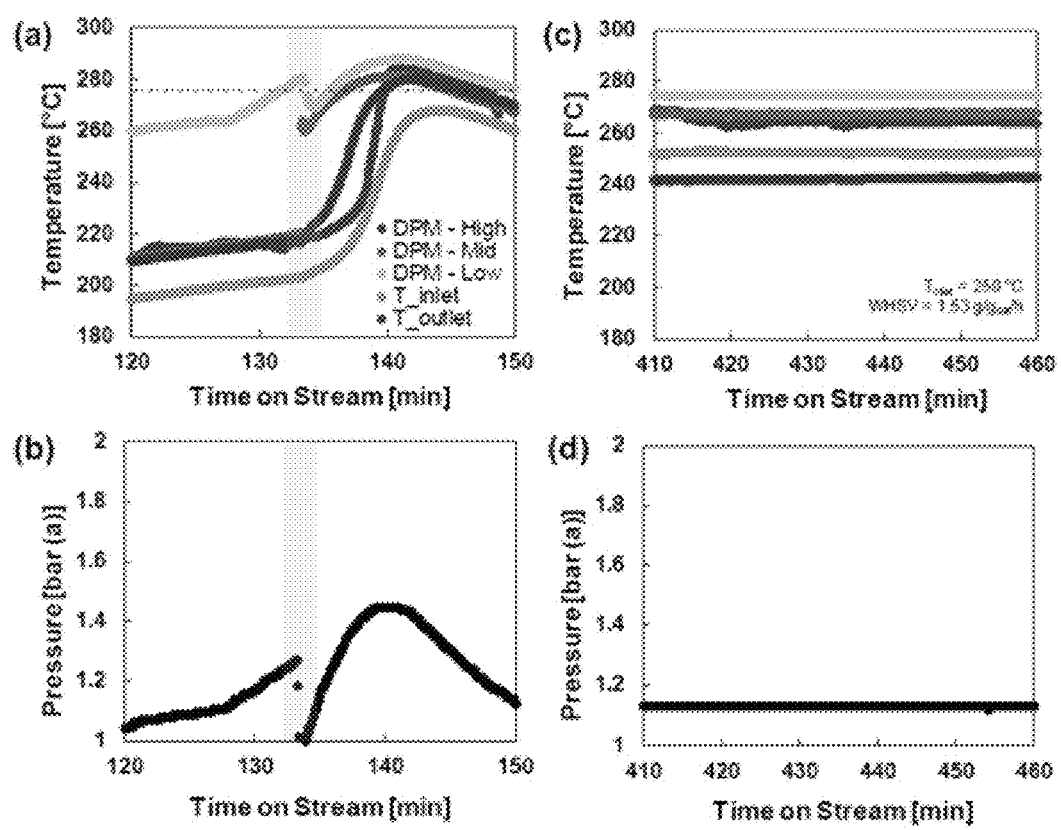
FIG. 10 shows the results of analyzing the temperature homogenization process in the start protocol of methanol steam reforming by vaporization of a heat transfer material.

FIG. 10 (a) shows a rapid temperature homogenization process in the start protocol of methanol steam reforming where a heat transfer material was used. Diphenylmethane was heated to 280° C. until 130 minutes, the pressure was increased to 1.3 bar, and a phase transition did not occur due to the gradually pressurized state. After purging the pressurized diphenylmethane within 133 minutes, the pressure dropped rapidly, and the diphenylmethane in the reactor was rapidly vaporized overall. Such activation led to rapid temperature homogenization of the catalyst bed in the next 10 minutes.

Referring to FIG. 10 (b), it can be confirmed that the inlet temperature was eventually adjusted to 250° C. according to the above-described pressure change.

Referring to FIGS. 10 (c) and (d), the graphs each represent stable operating temperature and pressure maintained when the process was performed using a heat transfer material when WHSV was 1.53 g/g$_{cat}$/h. Here, TDPM-low was set to 275° C. and T$_{inlet}$ was set to 250° C. Since the boiling point of DPM at 1.15 bar was about 270° C., TDPM-high and TDPM-mid at about 270° C. suggest that the temperature around the catalyst bed was homogenized through continuous condensation and vaporization cycles of the heat transfer material.

The reactor according to the embodiments of the present invention whose T$_{outlet-inlet}$ was about −10° C. showed only about ⅓ of the temperature difference compared to the reactor in which a heat transfer material was not used, and accordingly, it can be seen that the internal temperature of the reactor can be homogenized by the heat transfer material.

Experimental Example 1-3. Thermal Stability Test of Heat Transfer Material

Figure 11:
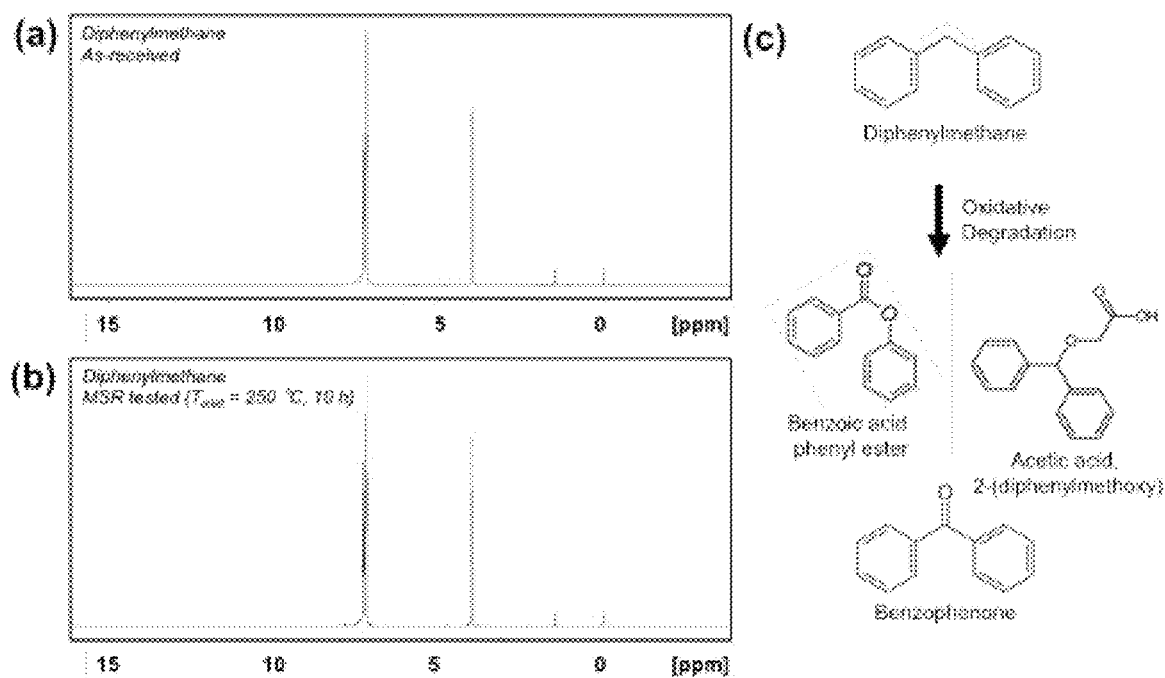
FIG. 11 shows the results of evaluating thermal stability of a heat transfer material.

FIG. 11 shows results of thermal stability evaluation of a heat transfer material.

Referring to FIGS. 11 (a) and (b), it can be confirmed that there was no peak shift of diphenylmethane before and after the methanol steam reforming reaction where T$_{inlet}$ was 250° C. for 10 hours through $^1$H-NMR spectroscopy.

Additionally, GC/MS analysis was further performed on the tested samples to investigate the degradation products. Oxidative degradation was mainly caused by a reaction between gases remaining in the reactor without being purged in the middle of the structure, and oxidized DPM in various forms was generated as shown in FIG. 11 (c). Through this, it can be confirmed that the reaction process can be further improved by using a stable heat transfer material that within the above-described temperature range and completely purging the inside of the reactor before the reaction.

Figure 12:
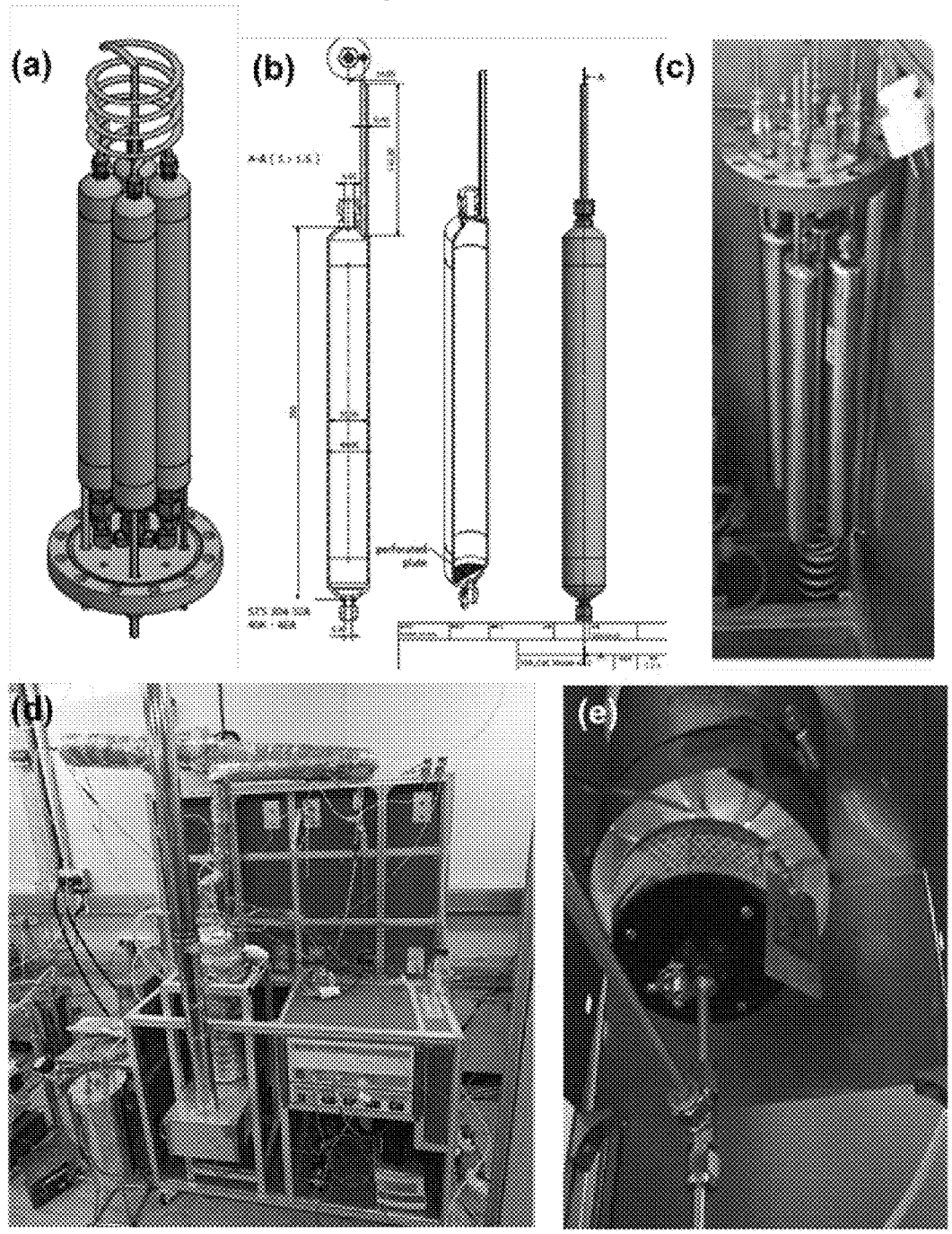
FIG. 12 is the reactor designed according to one embodiment of the present invention.

FIG. 12 is the reactor designed according to one embodiment of the present invention.

2. Design of Methylcyclohexane (MCH) Dehydrogenation Reactor for Extracting Hydrogen at 10 L/min As still another embodiment of the present invention, a methylcyclohexane (MCH) dehydrogenation reactor capable of producing hydrogen at 10 L/min was prepared as shown in FIG. 12.

First, as shown in FIG. 12 (a), a 1,400 mL-tubular reactor connected in series was designed to be located along with a 2.7 kW-electric heater that provides heat generated from a resistor when an electric current flows. The detailed design of the tubular reactor is shown in FIG. 12 (b), and the actual reactor prepared therefrom is shown in FIG. 12 (c). Next, as shown in FIG. 12 (d), a preheater (1 kW), a heat exchanger (10,000 kcal/hr), a gas-liquid separator, MFC and MFM, and the like, which are components relating to balance-of-plant (BOP), were arranged to constitute an entire dehydrogenation system. At this time, as shown in FIG. 12 (e), a combustion device for providing heat by combusting fuel was installed at the bottom of the reactor to constitute a complex heat source.

Here, since the boiling point of monobenzyl toluene in a weakly pressurized state meets the temperature range for the dehydrogenation process, Mariotherm LH, a commercially available monobenzyl toluene, was used as the heat transfer material.

Next, 10 wt % Pd/C pellet catalyst (Riogen, 560 g) was charged into a U-shaped reactor. The catalytic activity for methylcyclohexane was tested while varying WHSV in the range of 0.3 g/g$_{cat}$/h to 2.5 g/g$_{cat}$/h (corresponding to 0.16 mL/mL$_{cat}$/h to 1.3 mL/mL$_{cat}$/h of LHSV) at atmospheric pressure (P=1 bar) and an inlet bed temperature of 320° C. The reactants were delivered by a multipurpose gear pump (Micropump I-drive, 500 rpm to 6,000 rpm).

Experimental Example 2-1. Extraction Experiment of Hydrogen at 10 L/min

Figure 13:
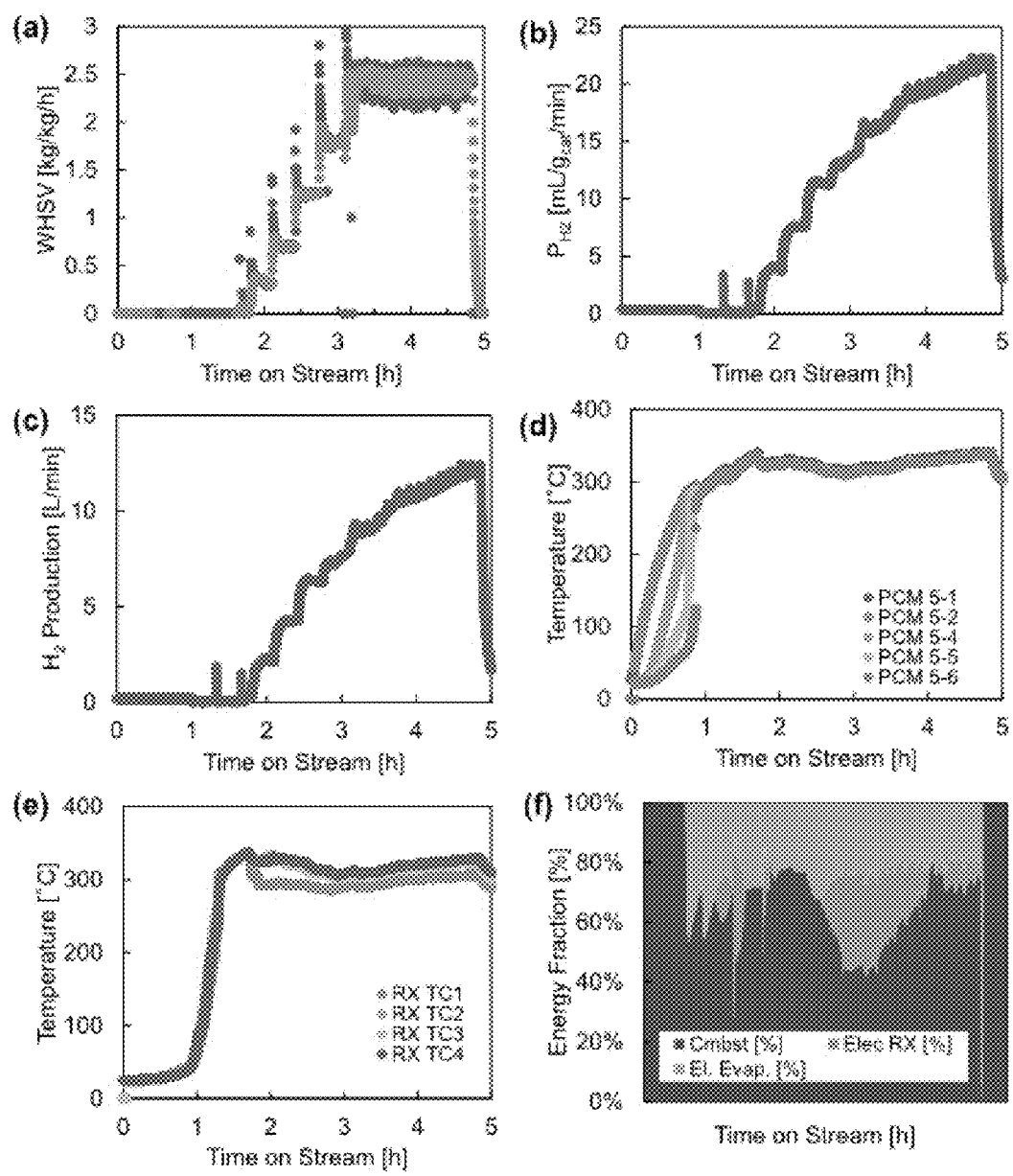
FIG. 13 is a graph showing the results of analyzing the characteristics of the heat transfer fluid-based complex heat source hydrogen extraction reactor of Experimental Example 2.

FIG. 13 is a graph showing the results of analyzing the characteristics of a heat transfer fluid-based complex heat source hydrogen extraction reactor of Experimental Example 2.

FIG. 13 shows the space velocity over time, the hydrogen production rate per unit catalyst, the total hydrogen production rate, the temperature gradient inside the reactor, the temperature gradient inside the heat transfer fluid, and the energy fraction of each heat source over time.

As shown in FIG. 13 (a), the injection amount of methylcyclohexane (MCH) was increased step by step. As can be seen in FIGS. 13 (b) and (c), the hydrogen production amount per unit catalyst amount was finally found to be 20 mL/g$_{cat}$/min or higher, and at this time, the total hydrogen production rate was also recorded at 12 L/min.

As can be seen in FIG. 13 (d), as the heat source was gradually provided to the reactor, a stepwise temperature rise took place according to the position of the heat transfer material in the reactor, and the internal temperature was unified with the phase change around the 1-hour region. Referring to FIG. 13 (e), it can be seen that the thermal management by the phase change started to have an effect even on the internal temperature of the reactor, and the internal temperature of the reactor was unified after 1 hour and increased significantly.

Through FIG. 13 (f), it can be seen that the energy fraction of the complex heat source of the reactor. In the beginning, heat was entirely supplied by the combustion device (blue fraction), and thereafter, the amount of combustion fuel was reduced so that the electric heater in the reactor could be used upon necessity of specific heat adjustment (a red fraction). The part which supplied heat to the reactant preheater for vaporization of the reactants is shown as a gray fraction. Through the use of such a complex heat source, it was shown to be possible to operate the catalytic reactor for hydrogen extraction with a minimized temperature gradient as shown in FIGS. 13 (d) and (e).

While the present invention has been described with reference to the preferred embodiments, it will be appreciated by those skilled in the corresponding art or those having ordinary knowledge in the corresponding art that the present invention may be modified and altered in various manners without departing from the spirit and technical scope of the present invention which are set forth in the following claims.

Therefore, the technical scope of the present invention must be defined by the appended claims rather than by the detailed description.

The invention claimed is:
1. A hydrogen extraction reactor, comprising:
a chamber including an inner space;
a reaction unit disposed within the inner space of the chamber and where an endothermic reaction for hydrogen extraction occurs;
a heating unit within the inner space of the chamber and spaced apart from the reaction unit; and
a heat transfer material disposed between the reaction unit and the heating unit, wherein the heat transfer material undergoes a phase transition between a gas phase and a liquid phase as heat is provided by the heating unit or used in the endothermic reaction of hydrogen extraction in the reaction unit.

2. The hydrogen extraction reactor of claim 1, wherein the reaction unit comprises at least one of a methane reforming reaction unit, a methanol reforming reaction unit, an ammonia decomposition reaction unit, a dehydrogenation reaction unit of liquid organic hydrogen carriers, a dehydrogenation reaction unit of formic acid or formate, or a dimethylether reforming reaction unit.

3. The hydrogen extraction reactor of claim 1, wherein the reaction unit is a dehydrogenation reaction of liquid organic hydrogen carriers, and further comprising a hydrogen separation unit for separating hydrogen from the liquid organic hydrogen carriers positioned at an outlet of the reaction unit.

4. The hydrogen extraction reactor of claim 3, wherein at least a portion of the hydrogen separated from the hydrogen separation unit is supplied to the heating unit to generate heat by combustion.

5. The hydrogen extraction reactor of claim 1, wherein the heating unit includes at least one of a combustion device that provides heat by combusting fuel, an electric heating device that provides heat generated from resistance when an electric current is applied, or a heat generating device using induction;

The heating unit includes at least one selected from a combustion device that burns fuel to provide heat, a heat transfer device that provides heat generated from resistance when an electric current flows, a heat generating device using induction, and a combination thereof.

6. The hydrogen extraction reactor of claim 1, wherein the heat transfer material circulates in the chamber.

7. The hydrogen extraction reactor of claim 1, wherein the chamber further comprises a pressure control valve to adjust the internal pressure of the chamber, which in turn controls the phase transition temperature of the heat transfer material.

8. The hydrogen extraction reactor of claim 1, wherein the heat transfer material is a hydrocarbon-based organic material.

9. The hydrogen extraction reactor of claim 8, wherein the hydrocarbon-based organic material has a gas-liquid phase transition temperature of 150° C. to 400° C.

10. The hydrogen extraction reactor of claim 8, wherein the hydrocarbon-based organic material comprises monobenzyltoluene, dibenzyltoluene, toluene, mono-$C_{12-14}$-alkyl derivatives, biphenyl, diphenyl oxide, diphenylmethane, naphthalene, or a combination thereof.

11. The hydrogen extraction reactor of claim 9, further comprising a device to circulate the heat transfer material present in the gas phase and disposed between the reaction unit and the heating unit to a low temperature region within the chamber.

12. A hydrogen extraction process, comprising:
supplying a hydrogen storage material to a reaction unit provided in a chamber;
heating a heat transfer material with a heating unit, and transferring heat from the heat transfer material to a reaction unit and the hydrogen storage material in the reaction unit, wherein the heat transfer material is a hydrocarbon-based organic material that has a gas-liquid phase transition temperature of 150° C. to 400° C.; and
extracting hydrogen from the hydrogen storage material, wherein the heat transfer material undergoes a phase transition between a gas phase and a liquid phase to control the temperature of the reaction unit such that the temperature does not deviate from a preset temperature range.

13. The hydrogen extraction process of claim 12, wherein the preset temperature range is from 150° C. to 400° C.

14. The hydrogen extraction process of claim 12, further comprising separating the hydrogen extracted from the reaction unit.

* * * * *